July 3, 1962

C. S. MERTLER 3,042,783

THERMAL-SENSING UNIT

Filed March 2, 1960

INVENTOR.
CHARLES S. MERTLER
BY
Woodling & Krost
ATTORNEYS

July 3, 1962

C. S. MERTLER 3,042,783

THERMAL-SENSING UNIT

Filed March 2, 1960

INVENTOR.
CHARLES S. MERTLER
BY Woodling + Kurst
ATTORNEYS

United States Patent Office 3,042,783
Patented July 3, 1962

3,042,783
THERMAL-SENSING UNIT
Charles S. Mertler, Mansfield, Ohio, assignor to Stevens Manufacturing Company, Inc., a corporation of Ohio
Filed Mar. 2, 1960, Ser. No. 12,410
9 Claims. (Cl. 219—37)

The invention relates in general to thermal sensing units and more particularly to temperature sensing units for use with heating units, such as household range surface heating units, to determine the temperature of a vessel heated on the heating unit in order to control the temperature of the vessel.

The invention relates to a temperature sensing unit for a heating unit which is mounted on a support bracket in turn carried on a frame. The temperature sensing unit includes a plate support adapted to be fixedly mounted relative to the support bracket with a sensor body positioned centrally of the heating unit plate support. The temperature responsive cap means is located at the top of the body and first and second electrical connections pass through the sensor body from the temperature responsive cap means to the lower end of the body and are connected to first and second flexible wires, respectively. First and second contact pins are fixedly carried relative to the plate support and are electrically connected to the first and second flexible wires, respectively, and are adapted for external electrical connection to the temperature responsive cap means. Spring means act to urge the temperature responsive cap means upwardly relative to the plate support to a level above that of the heating unit with only the flexible wires being flexed upon stressing of the spring means.

The temperature sensing unit of the present invention is useful with household ranges, such as electric ranges, which have in recent years been provided with some form of control device to determine the temperature of a vessel being heated and, in turn, to use this as a control for the heat input from the heating unit to the vessel. Normally range surface units are circular with an open center and temperature sensing units may be mounted in the center of this heating unit. Also normally range surface units have a drip pan underneath the heating unit to catch any material boiled over from a vessel. These drip pans need cleaning and, accordingly, the range surface units have been made removable either partially or completely. Some range surface units have a permanent but flexible electrical connection at a terminal block and others have a completely separable electrical connection at a terminal block, in either case, the unit is removable sufficiently to permit removal of the drip pan for cleaning.

Accordingly, with either type of range surface unit it is an object of the present invention to provide a temperature sensing unit that is mounted on and movable with the surface heating unit so as to move out of the way for ready cleaning or removal of the drip pan.

Another object of the invention is to provide a temperature sensing unit for a heating unit which may utilize a drip pan which is not apertured in the center, and hence, avoids spillage below the drip pan.

Still another object of the invention is to provide a small compact thermal sensing unit which is directly supported by the heating unit.

Still another object of the invention is to provide a temperature sensing unit for a heating unit which is simple, rugged and reliable and has a long life.

Still another object of the invention is to provide a temperature sensing unit for a range surface unit wherein a spring urges a part of the temperature sensing unit into engagement with the underside of a vessel and the movement of the spring is permitted by flexible wires which move substantially perpendicular to their length so as to stress these flexible wires a minimum amount.

Another object of the invention is to provide a range surface unit with a temperature sensing unit which has contact pins for separable engagement with terminals which become separated at the same time as disconnection of contacts of the heating unit itself with energization terminals.

Other objects and a fuller understanding of this invention may be had by referring to the following description and claims, taken in conjunction with the accompanying drawings, in which:

Figure 1:
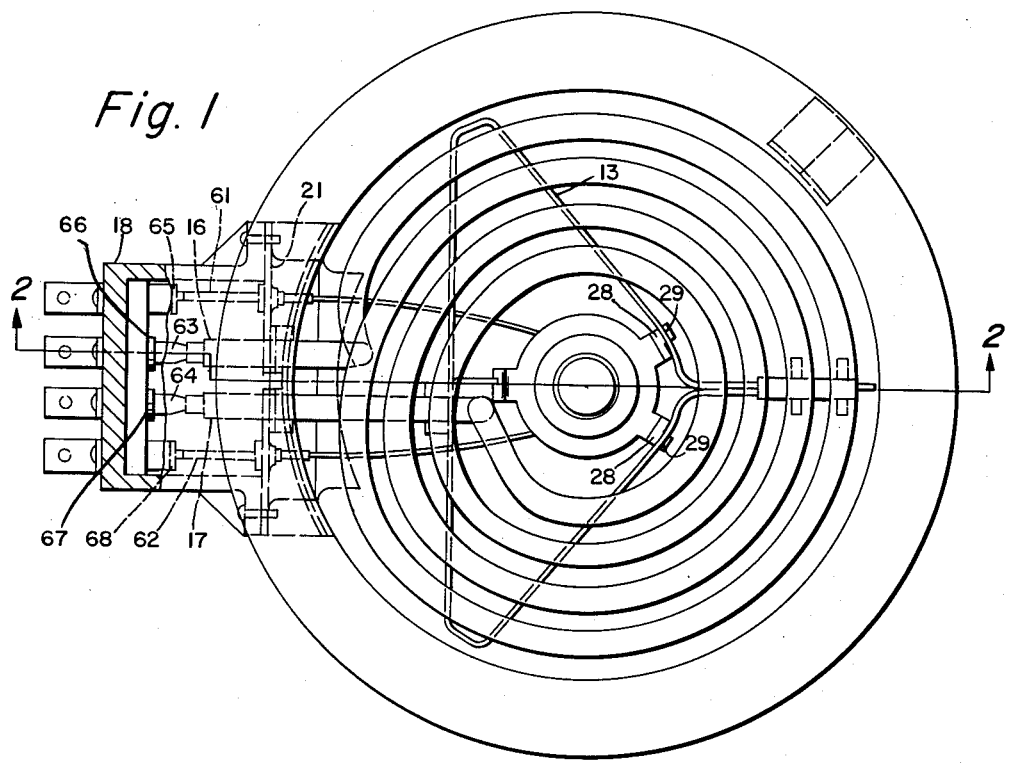
FIGURE 1 is a plan view of a surface heating unit incorporating the thermal sensing unit of the invention.
Figure 2:
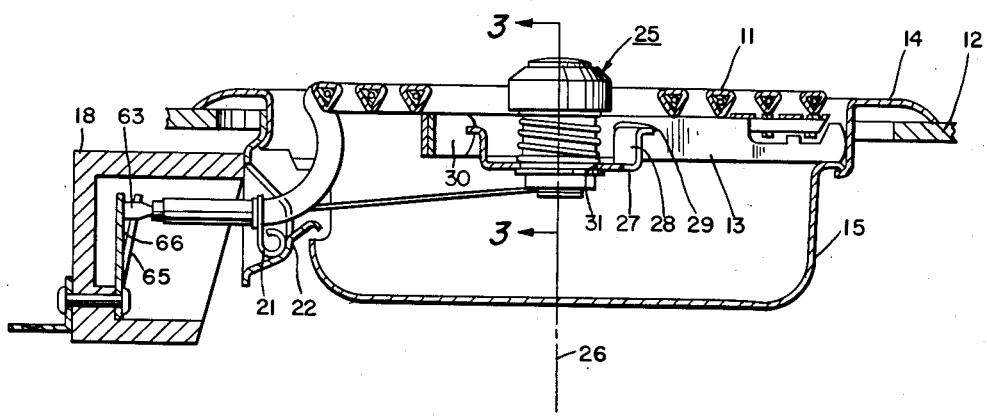
FIGURE 2 is a sectional view on line 2—2 of FIGURE 1.
Figure 3:
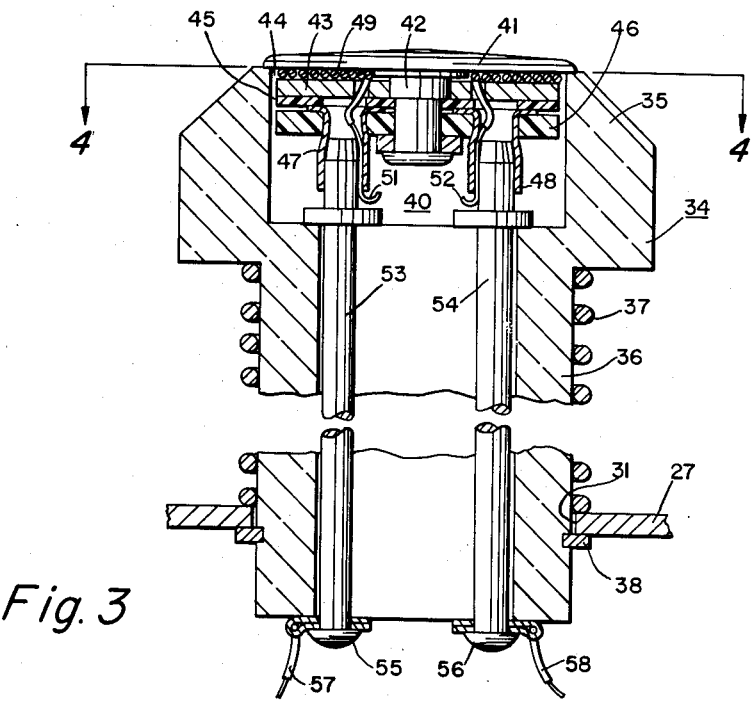
FIGURE 3 is an enlarged sectional view on line 3—3 of FIGURE 2.

The figures of the drawing show generally a surface heating unit 11 of a range having a range top or frame 12. This surface heating unit has been shown as a tubular sheathed heater to form an electrical heating unit. The heating unit 11 is carried on a support bracket 13 which, in turn, is carried in an outer rim 14 resting on the range top 12. A drip pan 15 is mounted on a flange of the outer rim 14 beneath the heating unit 11 to catch any spillage from vessels on the heating unit. This drip pan has been shown as being closed; that is, not having an aperture in the center. The heating unit 11 has first and second rigid tubular connections 16 and 17 which are extensions of the heater 11 for electrical connection at a terminal block 18. This terminal block is fixedly attached to the frame or top 12. The electrical connection is made at the terminal block 18 when the heating unit 11 is in a normal position resting on the range top 12 and with a mounting bracket 21 fixedly attached to the tubular connections 16 and 17 engaging a latch plate 22 which is fixed relative to the terminal block 18.

The temperature sensing unit 25 is adapted to be mounted generally on the central vertical axis 26 of the heating unit 11. A flat thin plate support 27 may be made of metal and is generally horizontally disposed beneath the center of the heating unit 11 and has 3 legs 28 engaging apertures 29 in the support bracket 13 and engaging a finger 30 on the support bracket 13 so that this plate support 27 is fixedly mounted relative to the support bracket 13. A central aperture 31 is provided in this plate support 27.

The temperature sensing unit 25 includes an insulator sensor body 34 having a flanged head 35 and a depending shank 36. The shank 36 slidably passes through the central aperture 31 and is urged upwardly by a compression spring 37 surrounding the shank 36. A snap ring 38 below the plate support 27 retains the sensor body 34 in this plate support.

A coaxial recess 40 is provided in the upper end of the flanged head 35 and an aluminum cap 41 is provided on the upper end of the head 35. This cap 41 has an integral stem 42 which extends into the recess 40. An aluminum backup washer 43 is provided on the stem 42 and establishes with the metal cap 41 an annular wire space 44. An insulating washer 45, for example, one made of mica, is next placed on the stem 42 and an insulating eyelet support washer 46 follows on the stem 42. First and second metal eyelets 47 and 48 are carried in the insulating eyelet support washer and held in place by their heads engaging the insulating washer 45.

Figure 4:
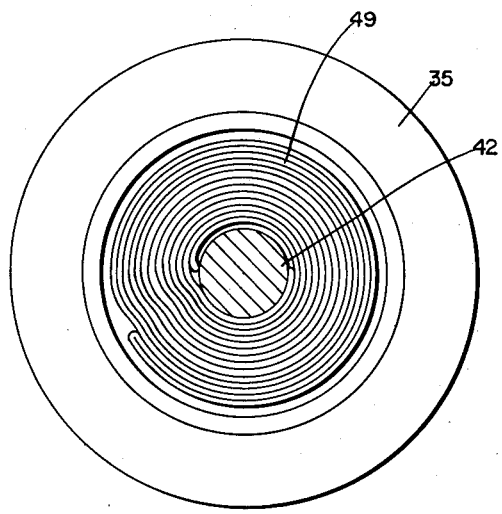
FIGURE 4 is a sectional view on line 4—4 of FIGURE 3.

A resistance wire 49 has first and second wire ends 51 and 52 disposed in the respective eyelets 47 and 48. These wire ends extend through apertures in the insulating washer 45 and in the metal back-up washer 43 to the annular wire space 44. In this wire space the wire 49 is wrapped as a pancake coil in a single axial thickness and preferably the wire is doubled as it is wrapped so that the two wire ends 51 and 52 are at the inner periphery of this pancake coil. This construction is better shown in FIGURE 4.

First and second rigid non-telescoping connector pins 53 and 54 extend in the recess 40 longitudinally through the body 34 and engage the respective eyelets 47 and 48. In so doing the respective wire ends 51 and 52 are mechanically gripped between the connector pin and the respective eyelet to provide electrical connection there between. The resistance wire 49 is insulated except, of course, at the electrical connection at the eyelets.

The connector pins 53 and 54 have exposed lower ends at the lower end of the body shank 36 which are riveted or headed at 55 and 56, respectively, to electrically connect to first and second flexible wires 57 and 58. These flexible wires extend generally horizontally underneath the heating unit 11 toward the terminal block 18. First and second contact pins 61 and 62 are fixedly carried outboard of the tubular connections 16 and 17 by the mounting bracket 21, and are connected to the flexible wires 57 and 58, respectively. The tubular connections 16 and 17 of the heating unit 11 have third and fourth contact pins 63 and 64 on the ends thereof for separable electrical connections at the terminal block 18. This terminal block includes first through fourth leaf spring terminals 65, 66, 67 and 68 for engagement by the contact pins. The first and second contact pins 61 and 62 engage the terminals 65 and 68, respectively, for external electrical connection to the resistance wire 49. Also the third and fourth contact pins 63 and 64 separately engage the terminal 66 and 67 for electrical energization to the heating unit 11. The terminals 65 and 68 may be displaced from the plane of the terminals 66 and 67 so as to lessen the possibility of the contact pins being inserted into engagement with the wrong terminals.

The entire surface heating unit 11 may be removed as a unit from the range top 12 and the temperature sensing unit 25 will be removed therewith because it is mounted on this heating unit 11 and separable electrical connections are provided which separate both the energization connections to the heating unit 11 and the sensing unit 25. The heating unit 11 may be lifted at the front in which case the mounting bracket 21 is released from behind the latch plate 22. Then the heating unit may be moved to disconnect the contact pins 61–64 from the terminals 65–68. This permits ready access to the drip pan 15. The drip pan is usually removable and since the heating unit 11 has been removed the drip pan 15 may also be easily removed.

The temperature sensing unit 25 has been shown with a completely removable heating unit 11 but also may be used with one wherein the electrical connections to the heating unit 11 are made merely by flexible connections to the terminal block which permits the heating unit 11 to be swung out of the way sufficiently to permit removal of the drip pan 15. In either case the temperature sensing unit 25 is mounted to the heating unit 11 and, hence, moves therewith. Since this sensing unit 25 is carried on the heating unit 11, rather than being fixedly carried relative to the entire range, there is no need to provide a centrally apertured drip pan 15, and accordingly, the chance of food spillage through such a central aperture is avoided.

The temperature sensing unit 25 is a small rugged unit which has no moving parts inside the body 34; hence, it is rugged and reliable with a long life. The connector pins 53 and 54 are solid and non-telescoping with no movement of any electrical connections within the body 34. The compression spring 37 urges the metal cap 41 upwardly to a level normally above that of the heating unit 11 so that it will engage the bottom of any vessel placed on the heating unit 11. In so doing the spring 37 is compressed, but such movement of the body 34 does not flex any wires inside it. The only flexing is provided by the wires 57 and 58 which lead generally horizontally toward the terminal block 18, and thus, this flexing is generally perpendicular to their length which establishes a minimum amount of stress in these flexible wires. Accordingly, the device has a long service life.

The resistance wire 49 may have glass insulation which is homogeneous for good heat transmission yet with high electrical resistance despite the radial thinness of the insulation. Also the fact that the resistance wire 49 is disposed in only a single layer and is contiguous with both the metal cap 41 and the metal back-up washer 43 establishes good heat transmission from the vessel to the resistance wire 49. This means that the thermal lag is quite small and permits the resistance wire to have a large change of resistance in the order of 2½ to 1 from room temperature to the high cooking temperatures.

With the resistance wire 49 wrapped as a doubled spiral this assures that the complete length of the resistance wire would be utilized to closely control the resistance thereof. This has an advantage over a single spiral because in such case one end of the wire would be at the inner periphery and the other end at the outer periphery and one could not be certain where this outer end would terminate and a part of the wire might have to be cut off or might not be disposed in good heat transfer relationship in the annular wire space 44. This means that the double spiral provides accurate control of the length and resistance of this wire 49.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A temperature sensing unit for a vessel heatable on a heating unit mounted on a support bracket and adapted to be connected at a terminal block to a frame, said temperature sensing unit comprising, in combination, a substantially horizontally disposed plate support adapted to be fixedly mounted relative to the support bracket for the heating unit, an insulator sensor body, slide bearing means slidably receiving said sensor body relative to said plate support generally vertically at the center of the heating unit, spring means acting to urge said body upwardly relative to said plate support, temperature responsive cap means on the top of said body, said cap normally disposed above the level of the heating unit by the urging of said spring means to engage the underside of any vessel on the heating unit, first and second electrical connections to said temperature responsive cap means, first and second non-telescoping connector pins passing longitudinally through said sensor body from the lower end of said body to a point near said cap means and electrically connected to said first and second electrical connections of said cap means, respectively, first and second terminals in said terminal block, first and second contact pins fixedly carried relative to the heating unit and engageable with said first and second terminals in said terminal block, and first and second flexible wires leading substantially horizontally from the lower ends of said connector pins in said body to said first and second contact pins, respectively, for external electrical connection to said temperature responsive cap means.

2. A temperature sensing unit for a vessel heatable on a surface unit mounted on a support bracket and adapted to be connected at a terminal block to a range top, said temperature sensing unit comprising, in combination, a substantially horizontally disposed plate support adapted to be fixedly mounted relative to the support bracket for the surface unit, an insulator sensor body, slide bearing means slidably receiving said sensor body relative to said plate support generally vertically on the axis of the surface unit, spring means acting to urge said body upwardly relative to said plate support, temperature responsive cap means on the top of said body, said cap normally disposed above the level of the surface unit by the urging of said spring means to engage the underside of any vessel on the surface unit, first and second electrical connections to said temperature responsive cap means, an insulating eyelet support washer disposed below said cap means, first and second eyelets in said eyelet support washer, first and second non-telescoping connector pins passing longitudinally through said sensor body from the lower end of said body to a point near said cap means and engaging said first and second eyelets, respectively, and said first and second electrical connections of said cap means, respectively, first and second terminals in said terminal block, first and second contact pins fixedly carried relative to the surface unit and engageable with said first and second terminals in said terminal block, and first and second flexible wires leading substantially horizontally from the lower ends of said connector pins in said body to said first and second contact pins, respectively, for external electrical connection to said temperature responsive cap means.

3. A temperature sensing unit for a vessel heatable on a surface unit mounted on a support bracket and adapted to be connected at a terminal block to a range top, said temperature sensing unit comprising, in combination, a substantially horizontally disposed plate support adapted to be fixedly mounted relative to the support bracket for the surface unit, an insulator sensor body, slide bearing means slidably receiving said sensor body relative to said plate support generally vertically on the axis of the surface unit, spring means acting to urge said body upwardly relative to said plate support, a metal cap on the top of said body, said cap normally disposed above the level of the surface unit by the urging of said spring means to engage the underside of any vessel on the surface unit, means defining an annular wire space with said metal cap, a resistance wire having two ends and disposed in said annular wire space, an insulating eyelet support washer disposed below said wire space, first and second eyelets in said eyelet support washer, first and second non-telescoping connector pins passing longitudinally through said sensor body from the lower end of said body to a point near said wire space and engaging said first and second eyelets, respectively, with said two wire ends mechanically gripped between each connector pin and the respective eyelet, first and second terminals in said terminal block, first and second contact pins fixedly carried relative to the surface unit and engageable with said first and second terminals in said terminal block, and first and second flexible wires leading substantially horizontally from the lower ends of said connector pins in said body to said first and second contact pins, respectively, for external electrical connection to said resistance wire.

4. A temperature sensing unit for a vessel heatable on a surface unit mounted on a support bracket and adapted to be connected at a terminal block to a range top, with a drip pan under the surface unit, said temperature sensing unit comprising, in combination, a substantially horizontally disposed plate support adapted to be fixedly mounted relative to the support bracket for the surface unit, an aperture in said plate support on the axis of the surface unit, said plate support lying above said drip pan, an insulator sensor body slidably received in said aperture of said plate support, spring means acting to urge said body upwardly relative to said plate support, a metal cap on the top of said body, said cap normally disposed above the level of the surface unit by the urging of said spring means to engage the underside of any vessel on the surface unit, a metal back-up member spaced from the underside of said cap to define an annular wire space therewith, a resistance wire having two ends and wrapped in a single axial thickness in said annular wire space, an insulating eyelet support washer disposed below said back-up member, first and second eyelets in said eyelet support washer, first and second non-telescoping connector pins passing longitudinally through said sensor body from the lower end of said body to a point near said wire space and engaging said first and second eyelets, respectively, with said two wire ends mechanically gripped between each connector pin and the respective eyelet, first and second terminals in said terminal block, first and second contact pins fixedly carried relative to the surface unit and engageable with said first and second terminals in said terminal block, and first and second flexible wires leading substantially horizontally from the lower ends of said connector pins in said body to said first and second contact pins, respectively, for external electrical connection to said resistance wire.

5. A temperature sensing unit for a vessel heatable on a surface unit mounted on a support bracket and adapted to be connected at a terminal block to a range top, with a drip pan under the surface unit, said temperature sensing unit comprising, in combination, a substantially horizontally disposed flat thin plate support adapted to be fixedly mounted relative to the support bracket for the surface unit, a central aperture in said plate support on the axis of the surface unit, said plate support lying above said drip pan, an insulator sensor body slidably received in said aperture of said plate support, spring means acting to urge said body upwardly relative to said plate support, a recess in the top of said body, a metal cap on the upper end of said body, said cap normally disposed above the level of the surface unit by the urging of said spring means to engage the underside of any vessel on the surface unit, a metal back-up member spaced from the underside of said cap to define an annular wire space therewith, a resistance wire having two ends and wrapped in a single axial thickness in said annular wire space, an insulating eyelet support washer disposed below said back-up member, first and second eyelets in said eyelet support washer, first and second non-telescoping connector pins passing longitudinally through said sensor body from the lower end of said body to said recess and engaging said first and second eyelets, respectively, with said two wire ends mechanically gripped between each connector pin and the respective eyelet, first and second terminals in said terminal block, first and second contact pins fixedly carried relative to the surface unit and engageable with said first and second terminals in said terminal block, and first and second flexible wires leading substantially horizontally from the lower ends of said connector pins in said body to said first and second contact pins, respectively, for external electrical connection to said resistance wire.

6. A temperature sensing unit for a vessel heated on a surface unit mounted on a support bracket and adapted to be connected at a terminal block to a range top, a drip pan under the surface unit, said temperature sensing unit comprising, in combination, a substantially horizontally disposed flat thin plate support adapted to be fixedly mounted relative to the support bracket for the surface unit, a central aperture in said plate support on the axis of the surface unit, said plate support lying above said drip pan, an insulator sensor body slidably received in said aperture of said plate support, spring means to urge said body upwardly relative to said plate support, an annular wire space in said body adjacent the top thereof, a resistance wire disposed in said annular wire space, an insulating eyelet support washer disposed against the underside of said annular wire space, first and second eyelets in said eyelet support washer, first and second non-telescoping connector pins passing longitudinally through said sensor body from the lower end of said body and engaging said first and second eyelets, respectively, with the two ends of said resistance wire mechanically gripped between each connector pin and the respective eyelet, first and second terminals in said terminal block, first and second contact pins fixedly carried relative to the surface unit and engageable with said first and second terminals in said terminal block, and first and second flexible wires led substantially horizontally from said first and second terminals to the lower ends of said first and second connector pins, respectively, for external electrical connection to said resistance wire.

7. A temperature sensing unit for a vessel heated on a surface unit mounted on a support bracket and adapted to be connected at a terminal block to a range top, and a drip pan under the surface unit, said temperature sensing unit comprising, in combination, a substantially horizontally disposed flat thin plate support adapted to be fixedly mounted relative to the support bracket for the surface unit, a central aperture in said plate support on the axis of the surface unit, said plate support lying above said drip pan, an insulator sensor body having a flanged head and having a depending shank slidably received in said aperture of said plate support, spring means acting to urge said body upwardly relative to said plate support, a recess in the head of said body, a metal cap on the upper end of said head and having a stem coaxially disposed in said recess, said cap normally disposed above the level of the surface unit by the urging of said spring means to engage the underside of any vessel on the surface unit, a metal back-up washer fitted over said stem and spaced from the underside of said cap to define an annular wire space, two wire apertures in said back-up washer, a resistance wire having the two ends thereof passed through said two wire apertures and wrapped in a single axial thickness in said annular wire space, an insulating eyelet support washer disposed on said stem below said back-up washer, first and second eyelets in said eyelet support washer, first and second non-telescoping connector pins passing longitudinally through said sensor body from the lower end of said body shank to said recess in said body head and engaging said first and second eyelets, respectively, with said two wire ends mechanically gripped between each connector pin and the respective eyelet, first and second terminals in said terminal blocks, first and second contact pins fixedly carried relative to the surface unit and engageable with said first and second terminals in said terminal block, and first and second flexible wires leading substantially horizontally from the lower ends of said connector pins in said body shank to said first and second contact pins, respectively, for external electrical connection to said resistance wire.

8. A temperature sensing unit for a vessel heated on a surface unit mounted on a support bracket and separably connected by tubular connections at a terminal block to a range top, and a drip pan under the surface unit, said temperature sensing unit comprising, in combination, a horizontally disposed flat thin plate support adapted to be fixedly mounted relative to the support bracket for the surface unit, a central aperture in said plate support on the axis of the surface unit, said plate support lying above said drip pan, an insulator sensor body having a flanged head and having a cylindrical depending shank slidably received in said aperture of said plate support, a compression spring surrounding said shank and acting between said plate support and said flanged head to urge said body upwardly, a snap ring engaging a groove in said body shank below said plate support and engageable with the underside of said plate support to retain said sensor body in said aperture in said plate support, a coaxial recess in the head of said body, a metal cap of good heat conductivity on the upper end of said head and having a stem coaxially disposed in said recess, said cap normally disposed above the level of the surface unit by the urging of said compression spring to engage the underside of any vessel on the surface unit, a metal back-up washer of good heat conductivity fitted over said stem and spaced from the underside of said cap to define an annular wire space, two wire apertures in said back-up washer, a resistance wire having the two ends thereof passed through said two wire apertures and wrapped as a doubled wire in a pancake coil in said annular wire space, an insulator washer disposed on said stem against the underside of said back-up washer and having apertures through which said wire ends are passed, an insulating eyelet support washer disposed on said stem against the underside of said insulating washer, first and second eyelets in said eyelet support washer, first and second non-telescoping connector pins passing longitudinally through said sensor body from the lower end of said body shank to said recess in said body head and engaging said first and second eyelets, respectively, with said two wire ends mechanically gripped between each connector pin and the respective eyelet, exposed lower ends on said connector pins below said body shank, first and second terminals in said terminal block, first and second contact pins fixedly carried relative to the surface unit and engageable with said first and second terminals in said terminal block, and first and second flexible wires led substantially horizontally from the exposed lower ends of said connector pins to said first and second contact pins, respectively, for external electrical connection to said resistance wire.

9. A temperature sensing unit for a vessel heated on a surface unit mounted on a support bracket and separably connected by tubular connections at a terminal block to a range top, and a closed drip pan under the surface unit, said temperature sensing unit comprising, in combination, a horizontally disposed flat thin plate support adapted to be fixedly mounted relative to the support bracket for the surface unit, a central aperture in said plate support on the axis of the surface unit, said plate support lying above said drip pan, an insulator sensor body having a flanged head and having a cylindrical depending shank slidably received in said aperture of said plate support, a compression spring surrounding said shank and acting between said plate support and said flanged head to urge said body upwardly, a snap ring engaging a groove in said body shank below said plate support and engageable with the underside of said plate support to retain said sensor body in said aperture in said plate support, a coaxial recess in the head of said body, an aluminum cap on the upper end of said head and having a stem coaxially disposed in said recess, said cap normally disposed above the level of the surface unit by the urging of said compression spring to engage the underside of any vessel on the surface unit, an aluminum back-up washer fitted over said stem and spaced from the underside of said cap to define an annular wire space, two wire apertures in said back-up washer, a resistance wire having the two ends thereof passed through said two wire apertures and wrapped as a doubled wire in a pancake coil in a single axial thickness in said annular wire space, a mica washer disposed on said stem against the underside of said back-up washer and having apertures through which said wire ends are passed, an insulating eyelets support washer disposed on said stem against the underside of said mica washer, first and second eyelets in said eyelet support washer, first and second non-telescoping connector pins passing longitudinally through said sensor body from the lower end of said body shank to said recess in said body head and engaging said first and second eyelets, respectively, with said two wire ends mechanically gripped between each connector pin and the respective eyelet, exposed lower ends on said connector pins below said body shank, first, second, third and fourth terminals in said terminal block, first and second contact pins fixedly carried relative to the surface unit and engageable with said first and second terminals in said terminal block, the surface unit having two contact pins electrically engageable with said third and fourth terminals at said terminal block for electrical energization therethrough, and first and second flexible wires led substantially horizontally from the exposed lower ends of said connector pins to said first and second contact pins, respectively, for external electrical connection to said resistance wire.

References Cited in the file of this patent

UNITED STATES PATENTS

| | | |
|---|---|---|
| 2,463,984 | Lederer | Mar. 8, 1949 |
| 2,806,122 | Thunander | Sept. 10, 1957 |
| 2,822,455 | Molyneaux et al. | Feb. 4, 1958 |